United States Patent
Lahav et al.

(10) Patent No.: US 10,445,163 B2
(45) Date of Patent: Oct. 15, 2019

(54) ADVANCED COMPUTER SYSTEM DRIFT DETECTION

(71) Applicant: PayPal, Inc., San Jose, CA (US)

(72) Inventors: Omri Moshe Lahav, Carmiel (IL); Raoul Christopher Johnson, San Jose, CA (US); David Tolpin, Ashdod (IL)

(73) Assignee: PAYPAL, INC., San Jose, CA (US)

( * ) Notice: Subject to any disclaimer, the term of this patent is extended or adjusted under 35 U.S.C. 154(b) by 155 days.

(21) Appl. No.: 15/719,279

(22) Filed: Sep. 28, 2017

(65) Prior Publication Data

US 2019/0095263 A1 Mar. 28, 2019

(51) Int. Cl.
*G06F 11/00* (2006.01)

(52) U.S. Cl.
CPC ........ *G06F 11/004* (2013.01); *G06F 2201/82* (2013.01); *G06F 2201/83* (2013.01)

(58) Field of Classification Search
CPC .. G06F 11/004; G06F 11/008; G06F 2201/82; G06F 2201/83
See application file for complete search history.

(56) References Cited

U.S. PATENT DOCUMENTS

| | | |
|---|---|---|
| 2010/0185596 A1 | 7/2010 | Dee |
| 2012/0209993 A1 | 8/2012 | Dee |
| 2016/0132521 A1* | 5/2016 | Reininger ............. G06F 16/156 707/739 |
| 2017/0161375 A1* | 6/2017 | Stoica ................... G06F 16/353 |
| 2018/0096149 A1* | 4/2018 | Morkovsky ............ G06F 21/52 |

OTHER PUBLICATIONS

Turner "How to control configuration drift . . . beyond configuration monitoring" http://www.orcaconfig.com/blog/control-configuration-drift/, Jan. 26, 2015, p. 1-9.
Casperson "MiniHash for dummies" http://matthewcasperson.blogspot.com/2013/11/minhash-for-dummies.html, Nov. 14, 2013, p. 1-12.
Hecht "What is Configuration Drift?" http://blog.continuitysoftware.com/blog/what-is-configuration-drift/, Feb. 17, 2019, p. 1-4.

* cited by examiner

*Primary Examiner* — Joseph R Kudirka
(74) *Attorney, Agent, or Firm* — Haynes and Boone, LLP

(57) ABSTRACT

Computer system drift can occur when a computer system or a cluster of computer systems deviates from ideal and/or desired behavior. In a server farm, for example, many different machines may be identically configured to work in conjunction with each other to provide an electronic service (serving web pages, processing electronic payment transactions, etc.). Over time, however, one or more of these systems may drift from previous behavior. Early drift detection can be important, especially in large enterprises, to avoiding costly downtime. Changes in a computer's configuration files, network connections, and/or executable processes can indicate ongoing drift, but collecting this information at scale can be difficult. By using certain hashing and min-Hash techniques, however, drift detection can be streamlined and accomplished for large scale operations. Velocity of drift may also be tracked using a decay function.

20 Claims, 6 Drawing Sheets

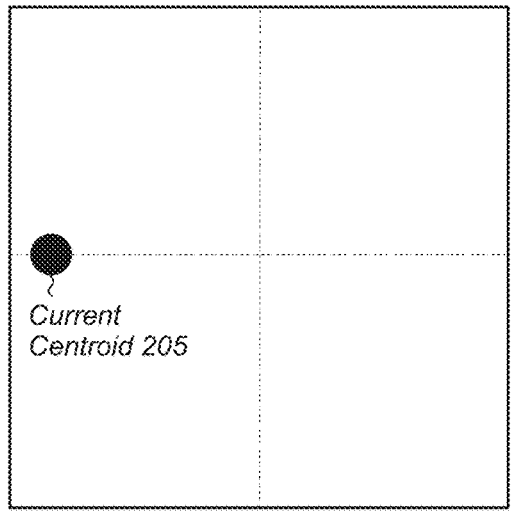
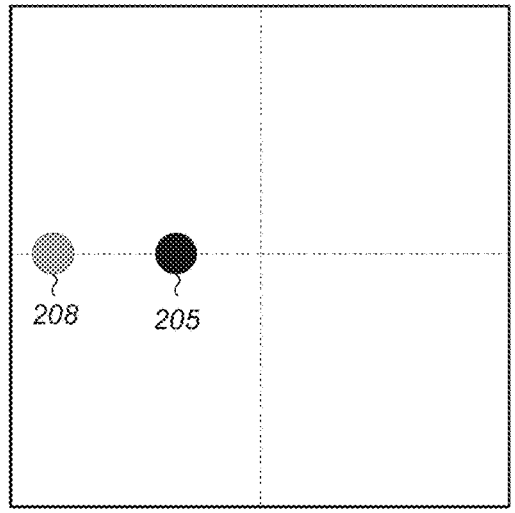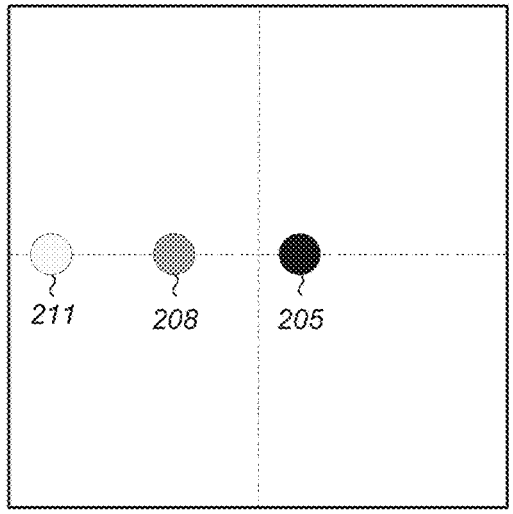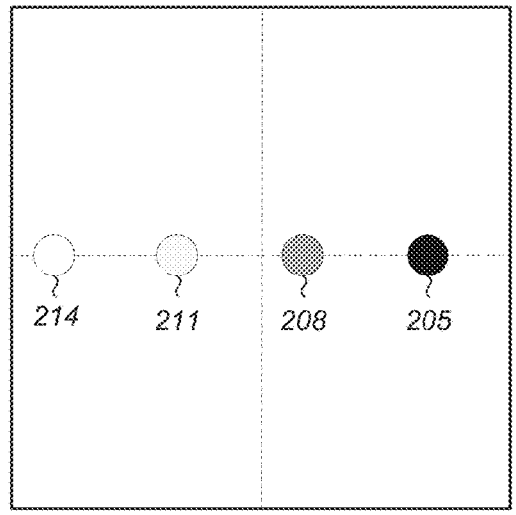

(t1)

(t2)

(t3)

US 10,445,163 B2

ADVANCED COMPUTER SYSTEM DRIFT DETECTION

TECHNICAL FIELD

This disclosure relates to computer networks and systems. More particularly, this disclosure relates to various techniques that can be used for detecting computer system drift in which a system may be operating and/or configured differently than expected. Performance and security can be significantly impacted by computer system drift.

BRIEF DESCRIPTION OF THE DRAWINGS

FIGS. 2A, 2B, 2C, and 2D illustrate block diagrams with graphical depictions of centroid system drift for a cluster over time, according to some embodiments.

DETAILED DESCRIPTION

Figure 1:
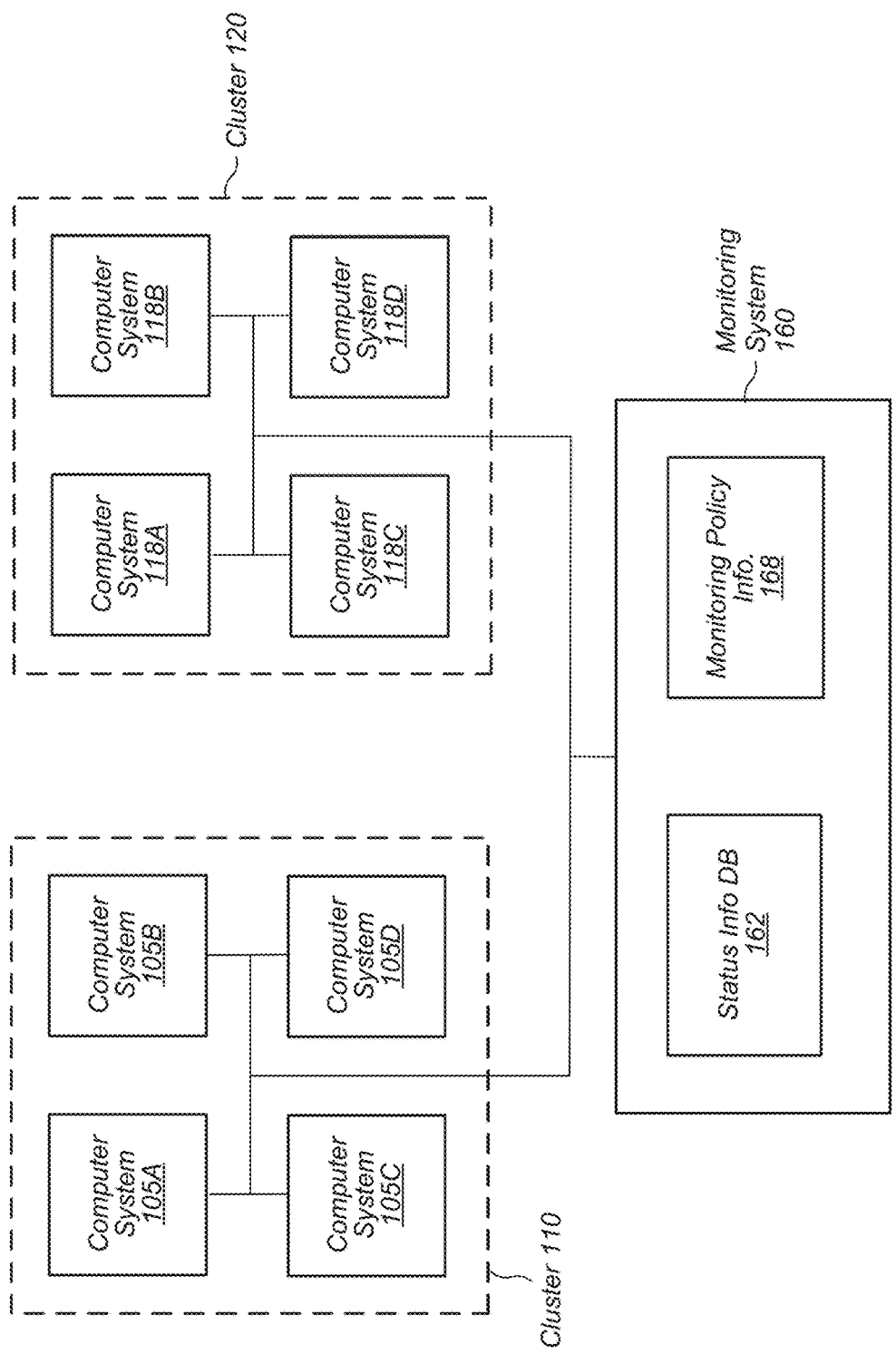
FIG. 1 illustrates a block diagram of a system that relates to computer systems and clusters of computer systems, according to some embodiments.

In some embodiments, computer system drift may occur among different servers in a cluster. Drift can be caused by a computer system's configuration changing over time, e.g., as a result of new or updated software being installed, or as a result of someone changing particular settings for a computer system (or some small amount of machines in a cluster, for example). An amount of disk cache space available to an operating system or other program, for example, could be increased from 2 GB to 8 GB. A port in a firewall could be opened or closed. There are countless examples of different ways in which a computer system's configuration can be changed.

Drift can also be indicated by changes to a computer system's network connections over time. For example, a computer server might have 25 particular TCP connections open to particular hosts at one time and another 3 UDP listening connections open at a first time, and then at a later time, could have 30 TCP connections open and 4 UDP listening connections. Network-indicated drift can be indicative of performance and/or security issues. In some instances, the 'netstat' command on LINUX systems can reveal the active network connections for a computer.

Drift can likewise be indicated by changes to a computer system's process tree. Processes may be opened, closed, or forked, thus changing the operational profile of the computer. The 'ps' command on LINUX can reveal process information for a computer, in various instances.

In various cases, combined detection is used to monitor configuration, network, and process changes. Thus, all three of these domains can be monitored simultaneously to see if a system and/or cluster is drifting at an unacceptable rate of change (or beyond an unacceptable threshold of change from a previous and/or ideal configuration). However, it is also possible to separately monitor one or more of configuration, network, and process metrics in various embodiments. Further, it is actually possible to monitor any type of information in a computer system while trying to detect drifts (though in particular, configuration drifts or security drifts may affect network connections and process trees so that information can be used in order to detect those drifts).

If a configuration discrepancy is identified (e.g. indicating server drift or malware), a variety of actions can be taken. An affected system can be re-imaged to a fresh configuration, potentially avoiding a service outage or other consequence. A server cluster helping to process electronic payment transactions, for example, can achieve higher performance if server drift is detected early, before an outage occurs. If a configuration discrepancy indicates that an attack has occurred or is occurring, the system can be quarantined and/or investigated for a security breach.

Velocity of drift change can also be an important indicator, in some instances, as to whether an alert notification should be generated. For example, a system that is very gradually drifting in its configuration at a steady rate may not be problematic enough to issue an alert. However, if a system that is slowly drifting increases its rate of drift by 200% for several consecutive reporting periods, for example, this shows a potential for increasing instability. In other words, a system that begins to drift faster (increasing its velocity) may be more likely at risk of a critical failure and/or security breach than another system that is not increasing in drift speed. This may be true even if a system's absolute level of drift is still relatively slow—which can help in catching a drift issue before a significant problem has occurred, in some cases.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. This diagram relates in various embodiments to ways in which computer systems can be organized and monitored. In this diagram, system 100 includes computer systems 105A, 105B, 105C, 105D, (hereinafter computer systems 105) 118A, 118B, 118C, and 118D (hereinafter computer systems 118), as organized into clusters 110 and 120. System 100 also includes a monitoring system 160 in this embodiment.

In the embodiment of FIG. 1, computer systems 105 and 118 are logically separated into two different clusters. Each of these clusters may be configured to perform distinct computing tasks, with each of the systems in the cluster contributing toward service. The clusters can also be organized to perform tasks in parallel (e.g. two or more systems simultaneously handling portions of a request) or can be organized to perform tasks in a load-sharing sharing effort (e.g., computer system 105A handles a first request while computer system 105B handles a second request). In one embodiment, clusters 110 and 120 perform tasks related to processing electronic payments, such as those handled by an electronic payment processor such as PayPal™. In yet other embodiments, clusters 110 and 120 may be configured to perform one or more of the same tasks or services, but also have at least one task or service that differs between the two clusters.

Monitoring system 160 is configured, in the embodiment shown, to receive various status information from computer systems 105 and 118. This status information is described in further detail below, but may be stored by monitoring system 160 in status information database 162.

Monitoring policy information 168 is also included in monitoring system 160 in the embodiment shown. This information may correspond to one or more monitoring policies, and include values and thresholds upon which notifications (e.g. alerts) can be sent to a user. For example, a monitoring policy might indicate that any time a particular computer system in cluster 110 has drifted by a particular amount, or is drifting above a threshold rate, an alert notification should be generated. Many different reporting options can be specified by a monitoring policy, including alerts that a server system may have drifted in its configuration significantly from other systems in a cluster, or that a cluster itself has drifted from a historical configuration (even if the systems in the cluster are still relatively uniform when compared to one another).

Note that many different equipment configurations are possible, and this disclosure is not limited to the organization shown in FIG. 1. For example, various networking and other equipment is not shown in FIG. 1. Other clusters and other systems may be present as well as will be apparent to one with skill in the art.

There are different types of drift that can be concerning. These drift types include (1) single system drift over time (e.g. one server computer experiences an increasingly changed set of configurations as time progresses, moving the server away from its previous and/or ideal configuration). Another drift type is (2) cluster centroid drift over time (e.g., a group of servers each shift their configurations in one or more particular similar areas, causing the average configuration for a cluster of systems to move in a specific direction).

Turning to FIGS. 2A-2D, block diagrams are shown illustrating graphical depictions of centroid system drift over time. Consider a group of computer systems, such as those in cluster 110. Each computer in a cluster may have a variety of different settings. If values for those settings are averaged and mapped to two dimensional space, for example, they might appear as current centroid 205. In other words, as shown, current centroid 205 represents a configuration settings average for a group of computer systems.

FIG. 2A shows a block diagram 200 of current centroid 205 at a first time t1. FIG. 2B shows a block diagram 230 current centroid 205 having drifted to the right by a later time t2. In this figure, the old centroid is now shown as historical centroid 208.

FIG. 2C shows a block diagram 250 current centroid 205 having drifted even further right by a later time t3. The previous current centroid is now shown as historical centroid 208, while the even older centroid is shown as historical centroid 211. FIG. 2D shows a block diagram 270 where current centroid 205 has continued to drift to the right. Historical centroid 214 now represents the oldest known historical data point for configuration status of the cluster, in this particular example.

As can be seen from FIG. 2D, current centroid 205 has migrated at a fairly steady and uniform pace (assuming a same time interval between t1, t2, t3, and t4). Thus, while the cluster configuration is drifting, it's rate of drift is not necessarily increasing (or decreasing). As discussed herein, an increasing rate of drift (e.g., greater drift in a subsequent period than an earlier period) may indicate more cause for alarm than a steady rate of drift, in various instances.

Figure 3A:
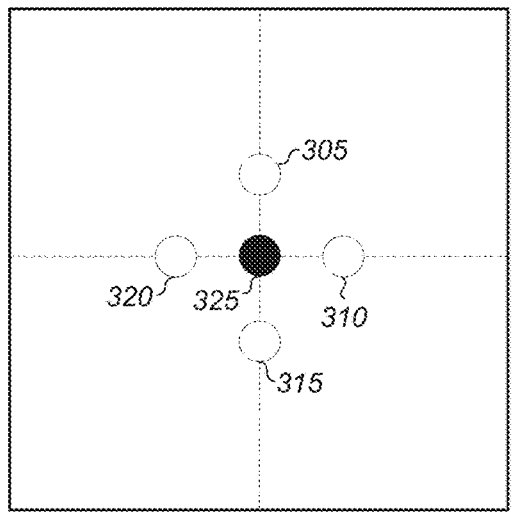
FIGS. 3A, 3B, and 3C illustrate block diagrams with graphical depictions of particular computer system configurations and resulting centroid calculations for a cluster, according to some embodiments.
Figure 3B:
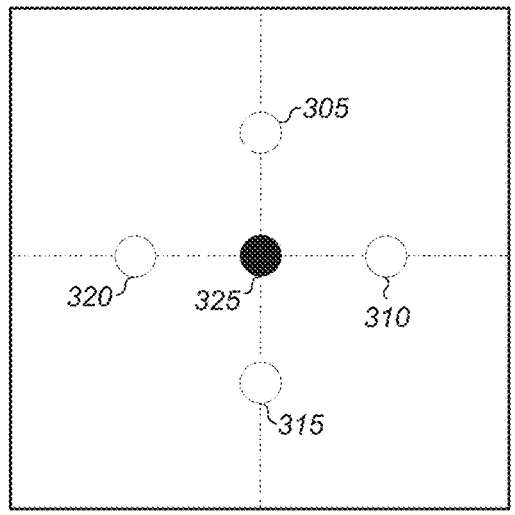
Figure 3C:
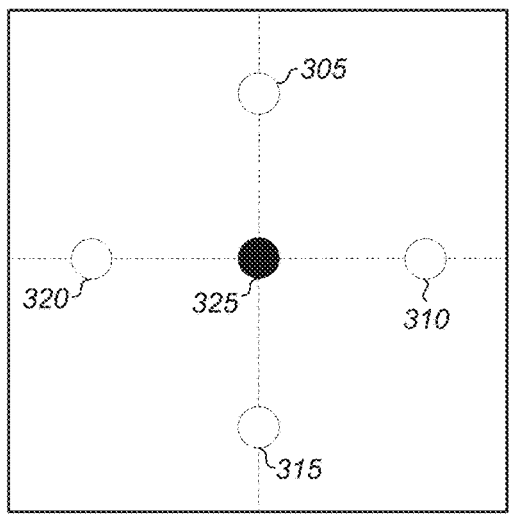

Turning to FIGS. 3A-3C, block diagrams are shown illustrating graphical depictions of particular computer system configurations and resulting centroid calculations for a cluster.

In FIG. 3A, block diagram 300 shows two dimensional representations for the configurations of computer systems 305, 310, 315, and 320, which are all in the same cluster in this example. Centroid 325 is located as the average of these four systems.

In FIG. 3B, block diagram 350 shows the same systems at a later time t2. In this case, each of computer systems 305, 310, 315, and 320 have drifted away from their previous configurations. However, while these systems have each drifted, the centroid 325 remains unchanged (as the configurations have drifted apart in opposite directions).

Turning to FIG. 3C, block diagram 380 shows the same systems at an even later time t3. In this case, each of computer systems 305, 310, 315, and 320 have drifted even further, but centroid 325 remains unchanged.

The examples above in FIGS. 3A-3C show that simply looking at centroid drift, in some instances, may be unsuitable for determining whether a drift problem is occurring. In these figures, the system cluster may be becoming increasingly unstable due to the drifting of individual systems, but merely looking at the centroid would not necessarily reveal this issue.

Figure 4:
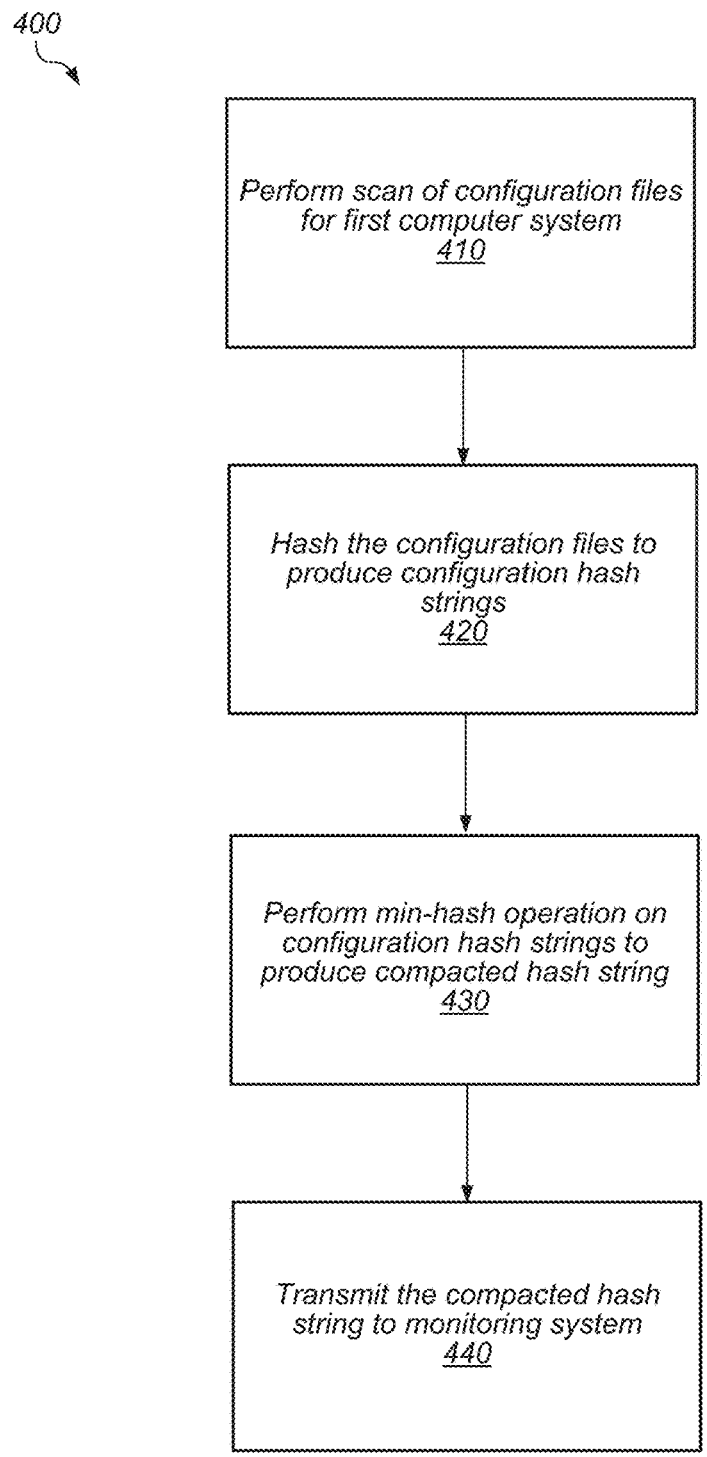
FIG. 4 illustrates a flowchart of a method that relates to detecting computer system drift by using hashing and min-hash techniques, according to some embodiments.

Turning to FIG. 4, a flowchart diagram is shown of one embodiment of a method 400 that relates to detecting computer system drift. Any or all operations described in method 400 may be performed by one or more processes running on computer system 105A in some embodiments, or one or more processes running on any suitable computer system or electronic device in other embodiments. In some embodiments, one or more parts of the operations of method 400 can be performed on different systems as well. For ease of explanation, however, operations described below will simply refer to computer system 105A.

In operation 410, computer system 105A performs a scan of a plurality of configuration files corresponding to a first computer system (e.g. computer system 105A). These configuration files may be locally stored on computer system 105A in various embodiments, or one or more of these files may also be remotely stored (e.g. on network attached storage). Thus, operation 410 can include scanning a local and/or remote storage drive for configuration files. In some cases, configuration files may be pre-identified as being of a particular file type (e.g. a file on a WINDOWS system), as being in a particular directory or type of directory structure, etc. Various rules can be used to identify whether a particular file (or portion of a file or other data structure) contains configuration information of interest.

In operation 420, computer system 105A hashes the plurality of configuration files to produce a corresponding first plurality of configuration hash strings. This operation can include running a hashing algorithm (e.g., MD5 or any other suitable hashing algorithm) on each of the scanned configuration files, producing a particular output string for that configuration file. In some instances, configuration information can be joined together, if desired, prior to this hashing (e.g., if a particular program is known to use 3 different particular configuration files, those could be concatenated together prior to operation 420).

Thus, operation 420 produces a hash value for groups of one or more configuration files in a plurality of configuration file—often simply producing just one configuration hash string for a particular configuration file. Each of these configuration hash strings is indicative of particular values and settings for a given configuration file at the time of the hash. At a later time, if the same configuration file is hashed again, it should produce the same hash value as long as the underlying configuration file has not changed.

The results from operation 420 can reduce megabytes or gigabytes of configuration information down to only a few hundred kilobytes, in various embodiments. However, in enterprises of large scale with tens or even hundreds of thousands of computing devices, this amount of data can still be problematically large when trying to centrally collect it and maintain a history over a period of time for all these machines. A further operation can reduce this data to an even more manageable size.

Accordingly, in operation 430, a min-Hash operation is performed on the first plurality of configuration hash strings (e.g. from operation 420) to produce a min-Hash signature for a first computer system. This min-Hash signature can include information indicative of a status for the plurality of configuration files corresponding to the first computer system. Min-Hashing on a set of configuration hash strings can deliver a min-Hash signature that is small in size (e.g. on the order of only a few KB or even a few hundred bytes in some embodiments), but can easily indicate whether changes have occurred to underlying configuration files.

In one embodiment, the min-Hashing operation uses multiple different hashing functions, and executes all of the hashing functions on the plurality of configuration hash strings. For each of the different hashing functions used on all of the particular configuration hash strings, only a minimum result is saved, in various embodiments.

Consider an example where there are 10 configuration file hash strings and 5 hashing functions being used for the min-Hashing operation. Each of the five hashing functions would be executed against the 10 configuration hash strings. For each hashing function, a different value will likely result from each of the 10 configuration hash strings. The minimum of the resulting 10 values, for that hash function, would be saved. This process would then be repeated for each of the four remaining hash functions, ultimately resulting in a min-Hash signature that includes (1) minimum value from first hash function; (2) minimum value from second hash function; . . . and (5) minimum value from fifth (and final) hash function, in this example. The size of the min-Hash signature may therefore be five values in length in this case.

Different numbers of hashing functions can be used, however, as part of the min-Hashing operation. For example, dozens (e.g. 20, 30, 40), hundreds (200, 500), or even thousands or more hash functions could be used in various embodiments. Note that regardless of the number of configuration hash strings, it is the number of the hashing functions that dictates the size of the resulting min-Hash signature. So, using a small number (e.g. only five) hashing functions to generate a min-Hash signature for thousands of configuration files could be problematic. A low ratio of the number of hash functions to the number of underlying data (e.g. configuration hash strings) being hashed can increase the probability of changes in the underlying data going unnoticed. Determining an appropriate number of hash functions is therefore a "game of probabilities" in various embodiments, dependent on the number of the functions themselves and the number of different pieces of underlying data being hashed (e.g. number of configuration hash string files). In general, longer min-Hash signatures are more accurate, but take more time to compute and require more capacity to store.

As a further example, when one of the system configuration files is changed, there is a probability that some of the minimal values (resulting from the min-Hash operation) will be changed. If a min-Hash signature of length of five (corresponding to five hash functions) is used, it means there will be an array containing these five values. If 40% of the configuration files will be changes, it would be expected (in relatively high probability) that 40% of the signature (2 out of the 5 cells) will change. If less than 20% of the files will be changed, there is no guarantee that the min-Hash operation would detect this change, however. Therefore, using signature of length 200, for example, is stable enough to expect to detect changes even in a small amount of the configuration files (roughly 0.5%).

To construct a min-Hash signature for a particular computer system, the min-Hash operation can therefore be run on the various configuration hash strings for that system, with each hash function used for the min-Hash function giving a particular integer value in various embodiments. These resulting integer values can be combined (e.g. concatenated) together to form the min-Hash signature. This min-hash signature may thus be indicative of a status for individual ones of a plurality of configuration files corresponding to a first computer system. Further, as will be apparent from the above, performing a min-Hash operation can easily reduce the size of data (e.g. the configuration file hash strings) by an order of magnitude or more (e.g. from hundreds of kilobytes to hundreds of bytes, in some instances (or even more, such as converting, if desired, gigabytes of information into less than 1 KB, depending on the number of hash functions used for the min-Hash operation, for example). This scaling can be extremely useful when dealing with large computing environments such as may be found in use by online service providers.

In operation 440, computer system 105A transmits the min-Hash signature to monitoring system 160, in various embodiments. Computer system 105A may also retain a local copy of the min-Hash signature for retention purposes. By transmitting the min-Hash signature, computer system 105A is effectively transmitting a highly compact snapshot of its current configuration status to monitoring system 160. Thousands of other computer systems, such as 105B, 118A, etc., may also perform the same operations of method 400, and transmit their min-Hash signatures to monitoring system 160. This can allow monitoring system 160 to detect configuration status changes across a large number of systems, without exceedingly high usage of storage and/or computing resources in various embodiments.

Additional scans can be performed subsequent to earlier scans in various embodiments of method 400. Thus, method 400 can include at a time subsequent to a first scan, performing an additional scan of a subsequent plurality of configuration files corresponding to the first computer system, hashing the subsequent plurality of configuration files to produce a second corresponding plurality of configuration hash strings, performing a min-Hash operation on the second plurality of configuration hash strings to produce a second min-Hash signature, and transmitting the second min-Hash signature to the monitoring system.

Note that the configuration files may change between an earlier and a later scan. The configuration files may be altered to change, delete, or add data, and configuration files themselves may be added or deleted (e.g., applications could be installed or uninstalled, for example). Thus, a subsequent scan may detect configuration files not initially scanned in a first earlier scan, or detect that one or more previously existing configuration files have now been deleted.

Network scans can also be performed, in some embodiments of method 400, by computer system 105A. Status information from the network scan can be likewise hashed and/or min-Hashed.

Thus, in one embodiment, method 400 includes performing a scan of network connections of the first computer system, creating a network status min-Hash signature indicative of results of the scan of the network connections, and transmitting the network status min-Hash signature to monitoring system 160. Network connection information can be gathered from a computer system by using the netstat command on WINDOWS or UNIX systems, for example. A netstat command may report information such as:

TABLE 1

Sample Network Connection Status Information

Active Connections

| Proto | Local Address | Foreign Address | State |
|---|---|---|---|
| TCP | 0.0.0.0:135 | 0.0.0.0:0 | LISTENING |
| TCP | 192.168.1.100:2558 | 207.68.172.236:80 | CLOSE_WAIT |
| TCP | 192.168.1.100:2930 | 204.245.162.27:80 | ESTABLISHED |
| UDP | 192.168.1.100:138 | *:* | |

Part or all of this information can be min-Hashed, similar to min-Hashing of configuration file hash strings. In some cases, the network connection information is small enough that it is relatively simply to perform a direct min-Hash operation on the data (as opposed to configuration files, where min-Hashing over thousands or more of potentially quite large configuration files could be very computationally expensive). Information about each of the network connections can be stored in a network status min-Hash signature, which may be calculated via a min-Hash operation similar to as discussed above. If a network connection is closed, or a new network connection is opened, the network status min-Hash signature will also consequently change (with a probability according to the number of hash functions used for the network min-Hashing, and the number of underlying network connections.) The network status min-Hash signature is transmitted to monitoring system 160 in various embodiments for centralized collection of information (many different computer systems may transmit network status information).

Different time periods for data collection can be used for system configuration data and network status data (as well as executable processes, discussed below). System configurations often include a large amount of information, and may change relatively slowly—for example, on any given day, a system may be unlikely to have a configuration change. Reporting periods of an hour, six hours, twelve hours, two days, etc. may be used in various embodiments for configuration data (though these lengths may be lesser or greater depending on embodiment). Network scans however may be performed more frequently than configuration scans in various embodiments, as network connections tend to change more rapidly. Thus, network status scans might occur every 30 seconds, 2 minutes, 5 minutes, 10 minutes, 60 minutes, or any other amount of time. Executable process scans (discussed below) can also be performed in shorter periods than configuration scans in various embodiments.

Method 400 can of course include repeated network scans—and thus, includes performing a subsequent scan of network connections of a first computer system, creating an additional network status min-Hash signature indicative of results of the subsequent scan of the network connections, and transmitting the additional network status min-Hash signature to monitoring system 160 in some embodiments.

Computer system 105A performs a scan of executable processes, creates an executable process status min-Hash signature indicative of results of the scan of the executable processes, and transmits the executable process status min-Hash signature to monitoring system 160 in various embodiments. The process scan may include collecting process tree information (e.g. each of a number of different processes executing on a computer and/or an operating system, which can be gathered by querying the operating system in various embodiments). The executable process status min-Hash signature may be generated in some instances by taking information on each process (e.g. name, directory location, size in memory, and/or other details, such as relationships between processes like parent-child process relationships) and performing the min-Hash operation on all that information. Note that the min-Hash functions used for network status and/or executable process status can be different from one another, and also different from the min-Hash functions used for configuration file hash strings. Like in networking, the size of process tree information may be small enough that is fine, from a performance standpoint, to simply run a min-Hash operation directly on the process data (rather than hashing first, like in various embodiments above for configuration files).

Process scans can be repeated, of course, to help detect changes over time. Thus, method 400 can include performing a subsequent scan of executable processes of a first computer system, creating an additional executable process status min-Hash signature indicative of results of the scan of the executable processes, and transmitting the additional executable process status min-Hash signature to monitoring system 160.

Figure 5:
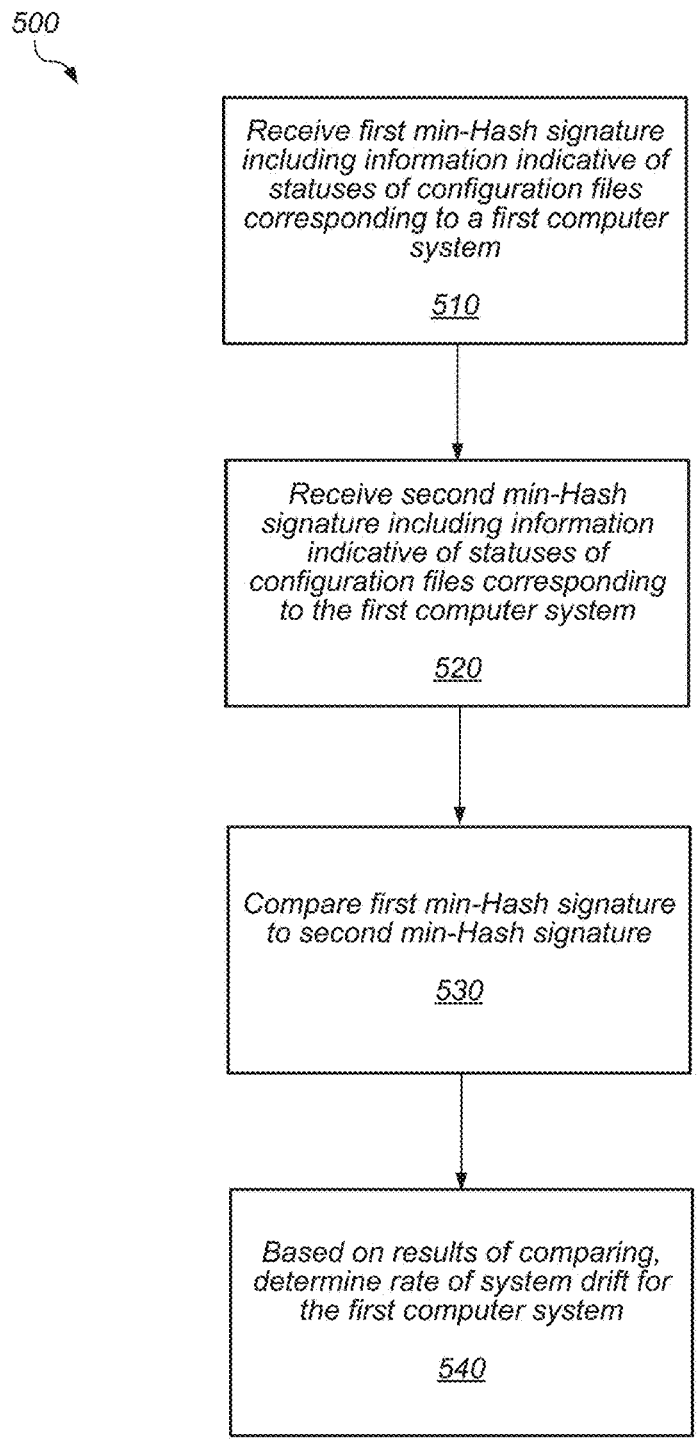
FIG. 5 illustrates a flowchart of another method that relates to detecting computer system drift by using data subjected to hashing and min-hash techniques, according to some embodiments.

Turning to FIG. 5, a flowchart diagram is shown of one embodiment of another method 500 that relates to detecting computer system drift. Any or all operations described in method 500 may be performed by one or more processes running on monitoring system 160 in some embodiments, or one or more processes running on any suitable computer system or electronic device in other embodiments. In some embodiments, one or more parts of the operations of method 500 can be performed on different systems as well. For ease of explanation, however, operations described below will simply refer to monitoring system 160.

In operation 510, monitoring system 160 receives a first min-Hash signature including information indicative of statuses of configuration files corresponding to a first computer system (e.g. computer system 105A), according to some embodiments. This min-Hash signature may be indicative of configuration status for a first computer system, for example. Thus, the first min-Hash signature may include information indicative of a status for individual ones of a first plurality of configuration files corresponding to the first computer system, where the first min-Hash signature was generated by a min-Hash operation performed on a first plurality of configuration hash strings produced from hashing a plurality of configuration files corresponding to the first computer system. (Also, note that monitoring system 160 may also receive many min-Hash signatures from many systems, not just a single system.)

In operation 520, monitoring system 160 receives at a later time a second min-Hash signature including information indicative of statuses of configuration files corresponding to the first computer system, according to some embodiments. Likewise, this min-Hash signature may include information indicative of a status for each of a second plurality of configuration files corresponding to the first computer system, wherein the second min-Hash signature was generated by performing the min-Hash operation on a second plurality of configuration hash strings produced from hashing the second plurality of configuration files corresponding to the first computer system.

The min-Hash signatures in operations 510 and 520 may include network connection and/or executable process information instead of configuration information, in some instances. That is to say, the operations of method 500 are adaptable to network connection and executable process related draft as well. In some embodiments, three different types of min-Hash signatures may be repeatedly received at monitoring system 160 (e.g. different strings for configuration, network connection, and executable process information), possibly at varying intervals.

In operation 530, monitoring system 160 compares the first min-Hash signature (e.g. from operation 510) to the second min-Hash signature (e.g. from operation 520), according to some embodiments. The comparing can include looking at the signatures to see what differences there are between the signatures, if any. If the signatures are identical, it is assumed that the configuration of the first computer system has not changed. If a particular portion of the second min-Hash signature differs from the first min-Hash signature, however, the differences can be examined to determine a quantity and/or specification of what configuration file(s) have changed. For example, a difference of at least one bit in a particular section of the signature might indicate that one or more configuration files have changed, or a larger difference might indicate a larger number of configuration files have changed (e.g. been modified, added, or deleted). This change difference may be in accordance with the probability dictated by the min-Hash function. For example, if 200 different hashes are used for the min-Hash, a difference in 7 sections of the signature would indicate that approximately 3.5% of the configuration files have changed (7*1/200).

In operation 540, monitoring system 160 determines a rate of drift for the first computer system based on the comparing in operation 530, according to some embodiments. Determining the rate of draft can be as simple as seeing that the two min-Hash signatures (from operations 510 and 520) are identical, and that there is no drift occurring, however, in many embodiments not just two but a number of past data points (e.g. K data points) are used to determine drift. An approximated rate of drift can be determined from an analysis of the differences. In the simplified case of only two data samples, if the compacted min-Hash signatures are 3% different and the files were created two days apart from each other, the rate of drift between these two days would be 1.5%. As explained below, however, drift calculations are typically more complex than simply looking at two data samples, and instead involve looking at multiple data samples collected over different time periods, in various embodiments.

Drift rate may be calculated, in some instances, by looking at K last data samples (where K can be any integer). Monitoring system 160 can examine min-Hash signatures to see if a rate of drift is steady, increasing, or decreasing. Sample 1 can be compared to sample 2, which can then be compared to sample 3, etc. If each subsequent sample shows a larger difference in drift, then monitoring system 160 can conclude the rate of drift is accelerating, and take action accordingly (e.g. such as issuing an alert), as discussed below.

In some cases, changes indicated by differences between min-Hash signatures can be reverse engineered to determine which configuration files and/or which portions of those files have been changed. Monitoring system 160 may know the scheme used by remote systems, for example, and be able to ascertain which files have changed. Or monitoring system 160 may also send remote queries to computer system 105A (or another system) requesting additional details or calculations. Those local systems may retain additional details that are not practicable to maintain at a centralized location (such as previous versions of configuration files, etc.).

The configuration status of a whole cluster of systems, not just a single system, can be calculated in various embodiments. Thus, method 500 may comprise calculating a current cluster configuration status for a cluster of computer systems including the first computer system based on a plurality of min-Hash signatures received from individual ones of the cluster of computer systems and determining whether the first computer system has a rate of system drift above a threshold rate based on the current cluster configuration. That is, a current average for a cluster can be determined and then the first computer system can be measured against this average. If the first computer system is moving away from the present average at a fast rate (e.g. above some specified threshold), an alert or notification can be issued.

Note that in various embodiments, rate of drift is a measure of how risk the drift may be. With every detected change in drift, a risk level of a machine (or group of machines) can be incremented or decreased. Thus, if drift is at a constant level, a relative risk level may be incremented by +1, in one embodiment. (Note that some amount of drift may always be expected in various embodiments, and thus, it may be of greater concern to see accelerations in drift.) If a drift rate is accelerating, then a risk level may be incremented by more than one (e.g. +2, +5, etc.) depending on the acceleration that is observed. Also, however, absolute drift from a historic baseline (e.g. fresh install) may be also monitored—and thus, if a constant, steady (not accelerating) rate of drift brings a machine above a particular risk threshold, an alert can still be issued. If drift decelerates or halts, a relative risk level can be decremented in various embodiments (e.g. the drift could reduce the relative risk level for a machine by −1, −2, etc., perhaps with greater amounts of reduction in risk level if a system drifts back toward a baseline configuration).

Historic centroid data can be used for a cluster of systems to make drift calculations. As discussed above, a configuration (or network, or process) centroid can be calculated by taking a weighted average of systems in a cluster. In some instances, high or low outliers can also be thrown out in calculating a centroid (e.g. top 5 or bottom 5 systems, top 3% or bottom 3% of systems, etc.) to avoid having the average unduly affected by an unusual system. In some embodiments, however, a centroid can be calculated by using most common values in a cluster, in which case outliers may not affect the centroid for the cluster. Every machine in a cluster can be compared to its own previous sample(s), but also to its distance from the centroid. The present distance from a particular machine to the centroid can also be compared to a previous distance of that particular machine to the centroid, to see if that machine may be drifting further from the centroid of a cluster.

Thus, in an embodiment, method 500 includes calculating a historic cluster configuration status for a cluster of computer systems including the first computer system based on a plurality of min-Hash signatures received from individual ones of the cluster of computer systems determining whether the first computer system has system drift above a threshold based on the historic cluster configuration status. This may include determining whether a first computer system is moving away from the historic cluster average above a particular rate of change/drift.

Cluster behavior as a whole, not just individual system behavior, can be analyzed for drift over time. For example, most or all of the systems in a cluster may be drifting in a slow yet particular manner over time. If these systems are moving similarly relative to one another, none of the systems may be accelerating away from the centroid configuration at a fast rate—and no alarm for an individual system might be sounded based on movement from the centroid (note, however, that absolute risk thresholds are used in various embodiments, such that even if an individual system is not drifting far from a shifting centroid, an alert can still be sounded once the system passes an absolute threshold on level of risk). Past configuration of the centroid can also be examined to see if the centroid as a whole is moving (e.g. as shown in FIGS. 2A-2D). If the centroid moves too far from a historical norm (particularly within a period of time), an alert can also be issued. Note that in some cases, a fresh installation configuration (e.g. at or shortly after systems in the cluster are freshly installed with some or all new software) may be used as a historical norm for reference, and if a cluster ever exceeds a certain amount of change from the fresh install configuration.

It also may be useful in various instances to look at both whole cluster behavior and individual behavior. In some cases, a centroid for a cluster may not change much, but individual systems within the cluster are changing significantly (but in ways that offset each other when averaging the centroid). Thus monitoring both the centroid and the individual systems may make sense.

Velocity of change for drift detection is also a useful concept in various embodiments. Thus, method 500 can include calculating the velocity of change for the first computer system's configuration status based on at least three different configuration status measurements.

To give an example, consider a first computer system that starts at an initial configuration. One day later, the configuration has changed by 0.1%. The next day, 0.2%, and the days after, 0.4% and 0.8%. In this scenario, the configuration is doubling in changes every day—possible a very unstable situation for which an alert should be issued. In contrast, a computer system that is steadily changing at a rate of 0.3% per day might be of less concern, since the rate of change is not accelerating. Velocity can play a factor in incrementing a relative risk level for a system and/or centroid. E.g., a small change in velocity (drifting away from a desired configuration) might boost the risk level +1, while a larger change in velocity could boost the risk level +5. Similar changes could be applied if a system or centroid drifts back toward a desired configuration.

Decay function can also be used in order to age out old data when using historical data for comparison purposes (either for centroid or an individual system). Thus, as one example, the most recent two configuration data (current and immediate past) might be given 100% relative weighting, while the next most recent configuration data could be given 90% relative weighting, followed by 80%, 70%, etc. Decay can be adjusted variously in different embodiments, and in some cases may be non-linear (e.g. an exponential curve can be used). Kernel density estimation can be used to achieve a useful decay function, in various embodiments.

Computer-Readable Medium

Figure 6:
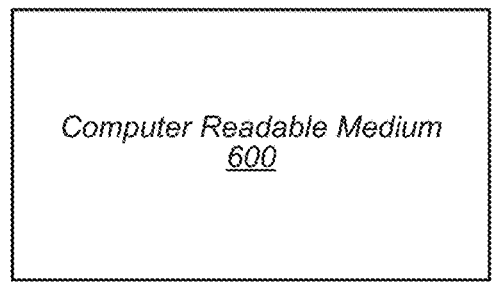
FIG. 6 is a block diagram of one embodiment of a computer readable medium.

Turning briefly to FIG. 6, a block diagram of one embodiment of a computer-readable medium 600 is shown. This computer-readable medium may store instructions corresponding to the operations of FIG. 4, FIG. 5, and/or any techniques described herein. In various embodiments, instructions corresponding to monitoring system 160 and/or computer system 105A may be stored on computer-readable medium 600.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script. Note that as used herein, the term "computer-readable medium" refers to a non-transitory computer readable medium.

Computer System

Figure 7:
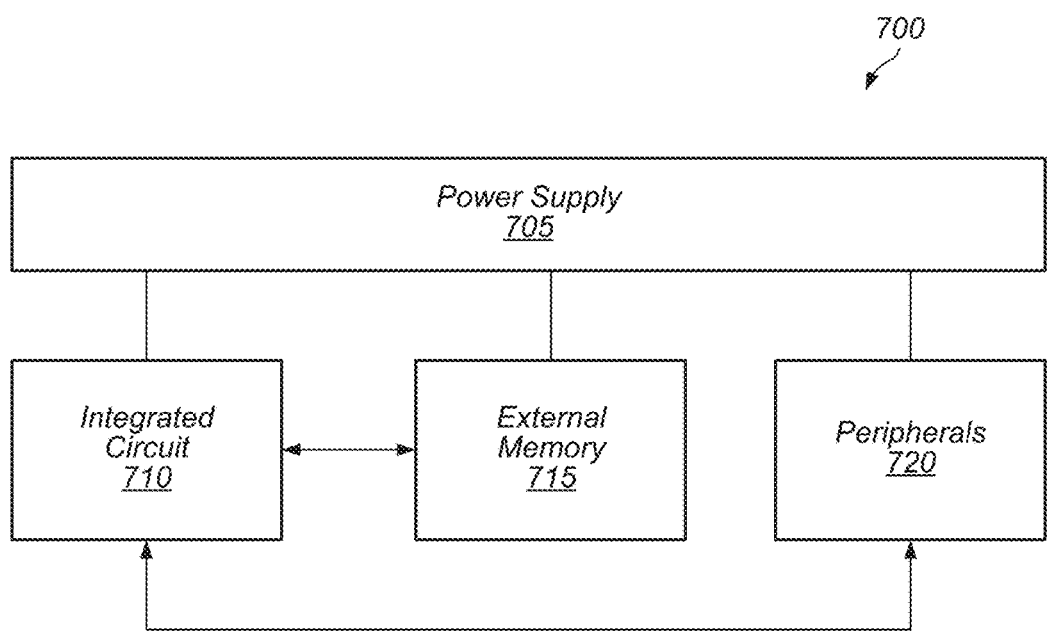
FIG. 7 is a block diagram of one embodiment of a computer system.

In FIG. 7, one embodiment of a computer system 700 is illustrated. Various embodiments of this system may be any of computer systems 105A-105D or any other computers systems as discussed above and herein. The abovementioned systems are not limited to the configuration shown in FIG. 7, however.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as Wi-Fi, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method to facilitate detecting system drift, comprising:
    performing a first scan of a plurality of configuration files corresponding to a first computer system, wherein the configuration files include information affecting one or more behaviors of the first computer system;
    hashing the plurality of configuration files to produce a corresponding first plurality of configuration hash strings;
    performing a min-Hash operation on the first plurality of configuration hash strings to produce a min-Hash signature for the first computer system, wherein the min-Hash signature includes information indicative of a status for individual ones of the plurality of configuration files corresponding to the first computer system; and
    transmitting the min-Hash signature, via a network, to a monitoring system.

2. The method of claim 1, further comprising:
    at a time subsequent to the first scan, performing an additional scan of a subsequent plurality of configuration files corresponding to the first computer system;
    hashing the subsequent plurality of configuration files to produce a second corresponding plurality of configuration hash strings;
    performing the min-hash operation on the second plurality of configuration hash strings to produce a second min-Hash signature; and
    transmitting the second min-Hash signature to the monitoring system.

3. The method of claim 2, wherein the subsequent plurality of configuration files include one or more recently added configuration files that were not scanned in the first scan.

4. The method of claim 2, wherein the subsequent plurality of configuration files does not include one or more deleted configuration files that were scanned in the first scan but were not scanned in the additional scan.

5. The method of claim 1, wherein the first min-Hash signature is at least one order of magnitude in reduced size from a total size of the plurality of configuration hash strings.

6. The method of claim 1, wherein the plurality of configuration files are stored on the first computer system.

7. The method of claim 1, wherein the first computer system is a server system configured to facilitate electronic payment transactions between users of an electronic payment transaction service.

8. The method of claim 1, wherein the first computer system is one of a plurality of computer systems in a cluster of systems configured to perform one or more particular operations for a service available via the network.

9. The method of claim 1, further comprising:
    performing a scan of network connections of the first computer system;
    creating a network status min-Hash signature indicative of results of the scan of the network connections; and
    transmitting the network status min-Hash signature to the monitoring system.

10. The method of claim 9, further comprising:
    performing a subsequent scan of network connections of the first computer system;
    creating an additional network status min-Hash signature indicative of results of the subsequent scan of the network connections; and
    transmitting the additional network status min-Hash signature to the monitoring system.

11. The method of claim 1, further comprising:
    performing a scan of executable processes of the first computer system;
    creating an executable process status min-Hash signature indicative of results of the scan of the executable processes; and
    transmitting the executable process status hash file to the monitoring system.

12. The method of claim 11, further comprising:
    performing a subsequent scan of executable processes of the first computer system;

creating an additional executable process status min-Hash signature indicative of results of the scan of the executable processes; and transmitting the additional executable process status hash file to the monitoring system.

13. A monitoring system, comprising:

a processor; and a memory having stored thereon instructions that are executable by the processor to cause the system to perform operations comprising:

receiving, from a first computer system, a first min-Hash signature, wherein the first min-Hash signature includes information indicative of a status for each of a first plurality of configuration files corresponding to the first computer system, and wherein the first min-Hash signature was generated by a min-hash operation performed on a first plurality of configuration hash strings produced from hashing a plurality of configuration files corresponding to the first computer system;

receiving, at a later time from receiving the first min-Hash signature, a second min-Hash signature that includes information indicative of a status for each of a second plurality of configuration files corresponding to the first computer system, wherein the second min-Hash signature was generated by performing the min-Hash operation on a second plurality of configuration hash strings produced from hashing the second plurality of configuration files corresponding to the first computer system;

comparing the first min-Hash signature to the second min-Hash signature; and based on results of the comparing, determining a rate of system drift for the first computer system.

14. The monitoring system of claim 13, wherein the operations further comprise:

calculating a current cluster configuration status for a cluster of computer systems including the first computer system based on a plurality of min-Hash signatures received from individual ones of the cluster of computer systems; and determining whether the first computer system has a rate of system drift above a threshold rate based on the current cluster configuration status.

15. The monitoring system of claim 13, wherein the operations further comprise:

calculating an historic cluster configuration status for a cluster of computer systems including the first computer system based on a plurality of min-Hash signatures received from individual ones of the cluster of computer systems; and determining whether the first computer system has system drift above a threshold based on the historic cluster configuration status.

16. The monitoring system of claim 13, wherein the operations further comprise:

calculating an historic cluster configuration status for a cluster of computer systems including the first computer system based on a first plurality of min-Hash signatures received from individual ones of the cluster of computer systems;

calculating a current cluster configuration status for the cluster of computer systems based on a second plurality of min-Hash signatures received from individual ones of the cluster of computer systems; and determining whether the cluster is drifting based on a comparison of the historic cluster configuration status to the current cluster configuration status.

17. The monitoring system of claim 13, wherein the operations further comprise:

calculating a velocity of change for the first computer system's configuration status based on at least three different configuration status measurements.

18. The monitoring system of claim 13, wherein the operations further comprise:

issuing an alert notification regarding drift for the first computer system based on comparing the first min-Hash signature to the second min-Hash signature.

19. A non-transitory computer-readable medium having stored thereon instructions that are executable by a system to cause the system to perform operations comprising:

performing a first scan of a plurality of configuration files corresponding to a first computer system, wherein the configuration files include information affecting one or more behaviors of the first computer system;

hashing the plurality of configuration files to produce a corresponding first plurality of configuration hash strings;

performing a min-Hash operation on the first plurality of configuration hash strings to produce a min-Hash signature for the first computer system, wherein the min-Hash signature includes information indicative of a status for each of the plurality of configuration files corresponding to the first computer system; and transmitting the min-Hash signature, via a network, to a monitoring system.

20. The non-transitory computer-readable medium method of claim 19, wherein the operations further comprise:

at a time subsequent to the first scan, performing an additional scan of a subsequent plurality of configuration files corresponding to the first computer system;

hashing the subsequent plurality of configuration files to produce a second corresponding plurality of configuration hash strings;

performing the min-Hash operation on the second plurality of configuration hash strings to produce a second min-Hash signature; and transmitting the second min-Hash signature to the monitoring system.

* * * * *